UNITED STATES PATENT OFFICE.

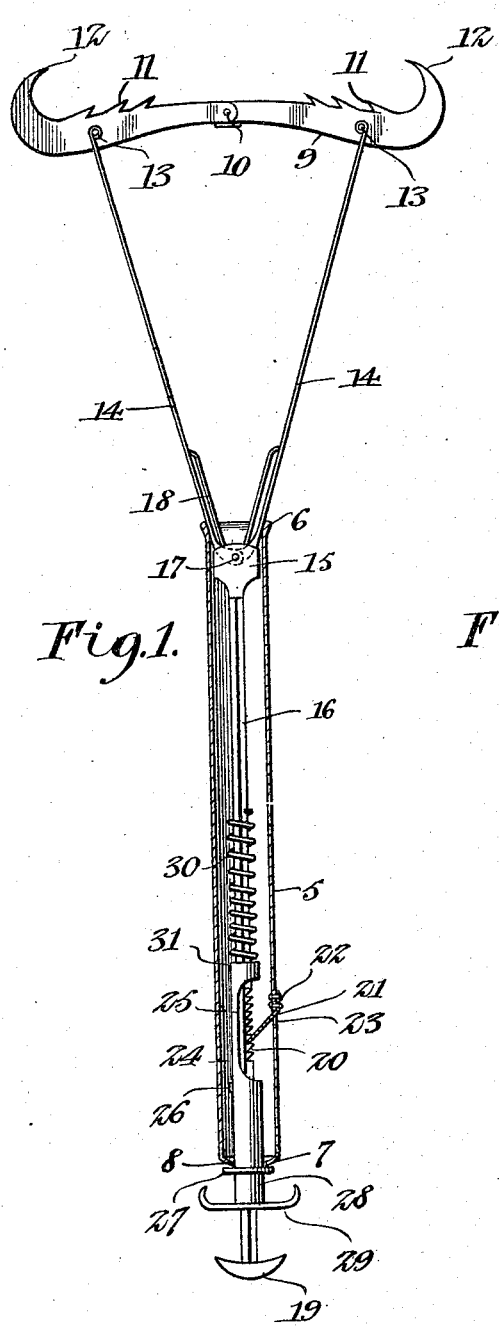
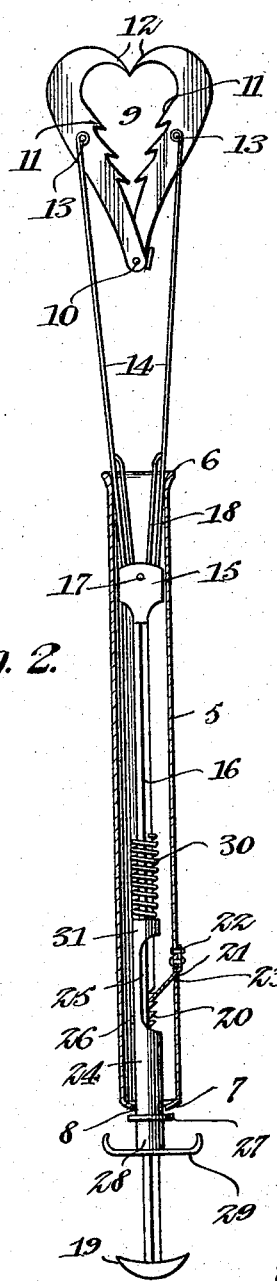

DUDLEY D. SMITH, OF CASTILE, NEW YORK.

FISH-GAFF.

1,187,193.　　Specification of Letters Patent.　　Patented June 13, 1916.

Application filed December 15, 1915. Serial No. 66,980.

*To all whom it may concern:*

Be it known that I, DUDLEY D. SMITH, a citizen of the United States, residing at Castile, in the county of Wyoming and State of New York, have invented new and useful Improvements in Fish-Gaffs, of which the following is a specification.

This invention relates to appliances employed by fishermen and more particularly to gaff hooks for the landing of fish.

The primary object of the invention is the provision of a device of this character wherein the jaws of the hook are pivotally connected together and when the jaws are in a set position the point of pivotal connection of the jaws is slightly above the center whereby the contact of the jaws with the fish will automatically close the same around the fish and thereby trapping the same.

A still further object of the invention is the provision of means for locking the jaws in a closed position and means slidably mounted upon the jaw operating means for permitting the movement thereof in a direction toward jaw setting position.

Another object of the invention is the provision of the mounting of the releasing means for the rod in such a manner as to permit of the simultaneous operation of said means with the operation of the jaw setting means.

With the above and other objects in view, the invention consists in the novel features, details of construction and combination of parts which will hereinafter be more fully set forth, illustrated in the accompanying drawing and pointed out in the appended claims.

In the drawings: Figure 1 is a longitudinal section showing the jaws in closed position. Fig. 2 is a longitudinal section showing the jaws in an open position.

Referring more specifically to the drawing wherein like reference characters refer to corresponding parts in the several views, 5 denotes a tubing preferably made of brass or the like material embodying a flared open end 6 and a closed end 7, the latter being formed with a centrally located enlarged opening 8.

The numeral 9 designates a pair of jaws pivotally connected together as at 10 and each of the jaws when in open position assume a substantially horizontal position, the inner faces of which are formed with teeth 11, as well as curved hooked ends 12 for penetrating the fish when the jaws are actuated. Pivotally connected with each of the jaws 9 at a point substantially medially of their length as indicated by the character 13 are tensioned spring links 14. The links 14 are pivotally connected between the spaced ears 15 of the head of the operating rod 16 by means of a pin 17. A tensioning spring 18 is coiled at its central portion around the pin 17 and has its leaves contacting with the opposed faces of the links for a portion of their length, the purpose of which is to hold the jaws in set position and elevating the pivotal points 10 slightly above the point of pivotal connection 13 of the links 14 with said jaws, the purpose of which will be hereinafter clearly set forth. The operating rod 16 is square in cross section and is mounted in the tubing 5 for a reciprocating movement, said operating rod being of a length greater than the length of the tubing and has its free end extending through the opening 8 and beyond the closed end wall 7 thereof. The protruding end of the operating rod is formed with a hand grip 19. The operating rod 16 has formed on one of the square faces thereof for a portion of its length a rack bar 20 adapted to be engaged by a resilient pawl 21 whereby the rod is locked against movement in a direction toward jaw setting position. The pawl 21 is riveted as at 22 to the exterior surface of the tubing 5 and extends angularly within the tubing 5 through the opening 23 thereof.

In order that the pawl 21 may be released from the rack bar 20 of the rod 16 to permit of the latter being moved in a direction toward jaw setting position, I provide a releasing member 24 comprising a cylindrical brass tubing having a cut out portion 25 for exposing the rack bar to permit of the engagement of the pawl 21 therewith. This releasing member embraces the operating rod 16 and is mounted thereon for a reciprocating movement, the stop 26 limiting the movement of the releasing member in a direction toward pawl engaging position, while the collar 27 controls the movement of the releasing member in an opposite direction. This releasing member extends also through the centrally located opening 8 of the closed end wall 7 of the casing 5 and projects therebeyond as at 28 and formed with a finger grip 29. It will, of course, be understood that the configuration of the bore of the release member 24 conforms with the configuration of the rod 16 whereby any accidental rotary movement of the release member upon the rod is prevented. The operating rod 16 is tensioned by means of the retractile spring 30, said spring being connected at one end to the said operating rod and having connection at its opposite end with the inner end of the operating head 31 of the release member 24 and it will, of course, be understood that the tension of this retractile spring 30 is greater than the tension of the spring 18, whereby upon engagement of the fish with the pivotal point 10 of the jaws 9 will release the tension spring 18 and said jaws will be drawn to a closed position through the medium of the retractile spring 30.

From the foregoing description, taken in connection with the accompanying drawing, the advantages of construction and of the method of operation will be readily apparent to those skilled in the art to which the invention relates, and while I have described the principles of operation of the device together with the device which I now consider to be the best embodiment thereof, I desire to have it understood that the device shown is merely illustrative and that such changes may be made when desired as are within the scope of the claims appended thereto.

I claim:

1. In a gaff hook, the combination of a tubing, an operating rod slidably mounted therein, a pair of pivotally connected jaws having pivotal connection with said rod, means for locking the rod against movement in a direction toward jaw setting position, and means slidably mounted upon the rod for releasing the said locking means and permitting the setting of the jaws.

2. A device of the class described, a tubing, a rod slidably mounted therein, a pair of pivotally connected jaws having pivotal connection with said rod, means for locking the jaws in closed position, and a releasing member slidably mounted upon the rod and adapted to be actuated to release the said locking means simultaneously with the operation of the operating rod in a direction toward jaw setting position.

3. In a device of the class described, a tubing, an operating rod having a rack bar slidably mounted within said tubing, a pair of pivotally connected jaws having pivotal connection with said rod, a pawl having connection with the casing and engaging with the rack bar of the rod for locking the rod against movement in a direction toward jaw opening position, and means slidably mounted upon the operating rod for releasing the pawl from engagement with the rack bar of said rod.

4. In a device of the class described, a tubing, an operating rod having a rack bar slidably mounted within said tubing, a pair of pivotally connected jaws having pivotal connection with said rod, a pawl having connection with the casing and engaging with the rack bar of the rod for locking the rod against movement in a direction toward jaw opening position, means slidably mounted upon the operating rod for releasing the pawl from engagement with the rack bar of said rod, and means for limiting the movement of the releasing means in opposite directions.

In testimony whereof I affix my signature in presence of two witnesses.

DUDLEY D. SMITH.

Witnesses:
CHAS. VAN ARSDALE,
HARRY VAN ARSDALE.

Copies of this patent may be obtained for five cents each, by addressing the "Commissioner of Patents, Washington, D. C."